US009165498B2

(12) United States Patent
Kim

(10) Patent No.: US 9,165,498 B2
(45) Date of Patent: Oct. 20, 2015

(54) ORGANIC LIGHT EMITTING DISPLAY AND POWER SUPPLY FOR THE SAME

(75) Inventor: Do-Ik Kim, Yongin (KR)

(73) Assignee: Samsung Display Co., Ltd., Yongin-si (KR)

(*) Notice: Subject to any disclaimer, the term of this patent is extended or adjusted under 35 U.S.C. 154(b) by 337 days.

(21) Appl. No.: 12/984,835

(22) Filed: Jan. 5, 2011

(65) Prior Publication Data

US 2011/0310076 A1 Dec. 22, 2011

(30) Foreign Application Priority Data

Jun. 21, 2010 (KR) ........................ 10-2010-0058777

(51) Int. Cl.
*G06F 3/038* (2013.01)
*G09G 3/30* (2006.01)
*G09G 3/32* (2006.01)

(52) U.S. Cl.
CPC ...... *G09G 3/3233* (2013.01); *G09G 2300/0842* (2013.01); *G09G 2330/02* (2013.01); *G09G 2330/021* (2013.01)

(58) Field of Classification Search
CPC ........................... G09G 3/3208; G09G 3/3233
USPC .................................................... 345/211, 76
See application file for complete search history.

(56) References Cited

U.S. PATENT DOCUMENTS 5,550,557 A 8/1996 Kapoor et al.
8,743,104 B2 6/2014 Tsai et al.
2004/0114401 A1 6/2004 De Anna et al.
2005/0162354 A1* 7/2005 Osame et al. .................. 345/76
2005/0243586 A1* 11/2005 Chung et al. .................... 365/49
2008/0055205 A1 3/2008 Chung et al.
2008/0174287 A1* 7/2008 Park .............................. 323/271

(Continued)

FOREIGN PATENT DOCUMENTS

CN 1512652 A 7/2004
CN 101231818 A 7/2008

(Continued)

OTHER PUBLICATIONS

Extended European Search Report dated Oct. 6, 2011, for corresponding European application 11170655.2, 10 pps.

(Continued)

*Primary Examiner* — Amare Mengistu
*Assistant Examiner* — Sarvesh J Nadkarni
(74) *Attorney, Agent, or Firm* — Christie, Parker & Hale, LLP

(57) ABSTRACT

An organic light emitting diode (OLED) display including: a display unit including pixels; and a power supply unit including: an output terminal; a reference terminal having an insulated output; and a bias circuit generating a first power source voltage from a received input voltage and supplying a second power source voltage to the reference terminal wherein the first power source voltage and the second power source voltage are voltages driving the plurality of pixels, wherein the bias circuit supplies the second power source voltage to the reference terminal and the plurality of pixels and is referenced to a ground voltage, and wherein a current flowing to the pixels flows to the reference terminal. In the OLED display, one power supply may be used as a power supply powering electroluminescence (EL), and thereby a cost of the OLED display may be reduced and a power efficiency may be improved.

17 Claims, 3 Drawing Sheets

(56) References Cited

U.S. PATENT DOCUMENTS

| | | | | |
|---|---|---|---|---|
| 2009/0108744 | A1 | 4/2009 | Park et al. | |
| 2009/0167264 | A1* | 7/2009 | Bayer et al. | 323/267 |
| 2010/0117937 | A1 | 5/2010 | Kim et al. | |

FOREIGN PATENT DOCUMENTS

| | | | |
|---|---|---|---|
| EP | 1 895 495 | A1 | 3/2008 |
| EP | 1 951 005 | A1 | 7/2008 |
| JP | 60-144774 | | 7/1985 |
| JP | 02-299467 | | 12/1990 |
| JP | 05-046119 | | 2/1993 |
| JP | 09-218663 | | 8/1997 |
| JP | 2001-155857 | | 6/2001 |
| JP | 2002-112547 | | 4/2002 |
| JP | 2004-144856 | | 5/2004 |
| TW | 201123138 | A1 | 7/2011 |
| WO | WO 2009/040340 | A1 | 4/2009 |

OTHER PUBLICATIONS

Taiwanese Office action dated Aug. 12, 2015, for corresponding Taiwanese Patent application 100102503, (5 pages).

* cited by examiner

ORGANIC LIGHT EMITTING DISPLAY AND POWER SUPPLY FOR THE SAME

CROSS-REFERENCE TO RELATED APPLICATION

This application claims the benefit of Korean Patent Application No. 10-2010-0058777, filed Jun. 21, 2010, in the Korean Intellectual Property Office, the disclosure of which is incorporated herein by reference.

BACKGROUND

1. Field

Aspects of the present invention relate to an organic light emitting diode (OLED) display and a power supply of the same. More particularly, aspects of the present invention relate to a power supply powering electroluminescence (EL) and an organic light emitting diode (OLED) display including the same.

2. Description of the Related Art

Currently, various flat panel displays having a reduced weight and volume have been developed. Types of the flat panel display include a liquid crystal display (LCD), a field emission display, a plasma display panel (PDP), and an organic light emitting diode (OLED) display. Among the flat panel displays, the OLED display displays an image by using light generated by an OLED by recombination of electrons and holes. The OLED display has gained attention because it has a rapid response speed, has low power consumption, has luminous efficiency, and luminance and a viewing angle which are excellent.

A type of OLED display is classified as a passive matrix OLED (PMOLED) and an active matrix OLED (AMOLED) according to a driving method of the OLED. Among the types, in views of resolution, contrast, and operational speed, the AMOLED that is selectively turned on with respect to every unit pixel is mainly used.

As a power source of the AMOLED, various power sources such as a power source powering EL and a power source powering computation, or logic and powering a system are required. Among them, a capacity of the power source powering the EL is largest. Particularly, the EL power source of a large capacity to generate light energy is required in a television (TV) having the AMOLED of a large size.

FIG. 1 is a block diagram showing an EL power supply according to a conventional organic light emitting diode (OLED) display. Referring to FIG. 1, an EL power supply of the conventional OLED display includes a +ELVDD power source circuit 10 and a −ELVSS power source circuit 20. The +ELVDD power source circuit 10 generates a +ELVDD voltage of the ELVDD power supply supplied to a pixel PX of the OLED display. The −ELVSS power source circuit 20 generates a −ELVSS voltage of the ELVSS power supply supplied to the pixel PX of the OLED display.

A DC power source of the external power supply is applied as an input voltages +Vin of both the +ELVDD power source circuit 10 and the −ELVSS power source circuit 20. A current flowing to the input voltage +Vin of the +ELVDD power source circuit 10 and the −ELVSS power source circuit 20 passes through the +ELVDD power source circuit 10 and the −ELVSS power source circuit 20 and the +ELVDD power source circuit 10 and the −ELVSS power source circuit 20 are grounded.

The +ELVDD power source circuit 10 generates the +ELVDD voltage, which is referenced to the ground (GND) voltage, from the current flowing in the input voltage +Vin.

The −ELVSS power source circuit 20 generates the −ELVSS voltage, which is referenced to the ground (GND) voltage, from the current flowing in the input voltage +Vin. The +ELVDD power source circuit 10 and the −ELVSS power source circuit 20 respectively generate the +ELVDD voltage and the −ELVSS voltage by using a transformer.

The +ELVDD voltage and the −ELVSS voltage, respectively generated in the +ELVDD power source circuit 10 and the −ELVSS power source circuit 20, are used to illuminate the pixels PX included in the OLED display. However, the −ELVSS power source circuit 20 has low converting efficiency compared with the +ELVDD power source circuit 10, and a cost of the OLED display is increased to additionally use the +ELVDD power source circuit 10 and the −ELVSS power source circuit 20.

The above information disclosed in this Background section is only for enhancement of understanding of the background of the invention and therefore it may contain information that does not form the prior art that is already known in this country to a person of ordinary skill in the art.

SUMMARY OF THE INVENTION

Aspects of the present invention provide an organic light emitting diode (OLED) display simplifying a power supply powering electroluminescence (EL) and that is capable of increasing power efficiency, and a power supply of the same.

According to an aspect of the present invention, there is provided an organic light emitting diode (OLED) including: a display unit including pixels; and a power supply unit including: an output terminal; a reference terminal having an insulated output; and a bias circuit generating a first power source voltage from a received input voltage and supplying a second power source voltage to the reference terminal, wherein the first power source voltage and the second power source voltage are voltages driving the pixels, wherein the bias circuit supplies the second power source voltage to the reference terminal and the pixels and is referenced to a ground voltage, and wherein a current flowing to the pixels flows to the reference terminal.

According to another aspect of the present invention, the first power source voltage may be an ELVDD voltage driving the OLED, and the second power source voltage may be an ELVSS voltage driving the OLED.

According to another aspect of the present invention, the output voltage of the output terminal may be a sum of the ELVDD voltage and the ELVSS voltage.

According to another aspect of the present invention, a voltage of the second power source may be lower than the ground voltage.

According to another aspect of the present invention, each of the pixels may include: an organic light emitting diode (OLED); a driving transistor controlling an amount of current flowing from an ELVDD electrode, the current being transmitted according to the first power source voltage to the OLED; and a switching transistor applying a data signal to the gate electrode of the driving transistor.

According to an aspect of the present invention, a power supply supplying an ELVDD voltage and an ELVSS voltage powering electro-luminescence of an organic light emitting diode (OLED) display, the power supply including: a power supply circuit receiving an input voltage to generate a first power source voltage, the power supply circuit including: an output terminal; and a reference terminal having an insulated output; and a bias circuit supplying a second power source voltage to the reference terminal.

According to another aspect of the present invention, the output terminal may be connected to an ELVDD power supply of the OLED display, and the reference terminal may be connected to an ELVSS power supply of the OLED display.

According to another aspect of the present invention, the first power source voltage may be an ELVDD voltage driving the OLED, and the second power source voltage may be an ELVSS voltage driving the OLED.

According to another aspect of the present invention, the output voltage of the output terminal may be a sum of the ELVDD voltage and the ELVSS voltage.

According to another aspect of the present invention, a voltage of the second power source may be a lower than the ground voltage.

According to another aspect of the present invention, in the OLED display, one power supply may be used as a power supply for EL, and thereby a cost of the OLED display may be reduced and a power efficiency may be improved.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
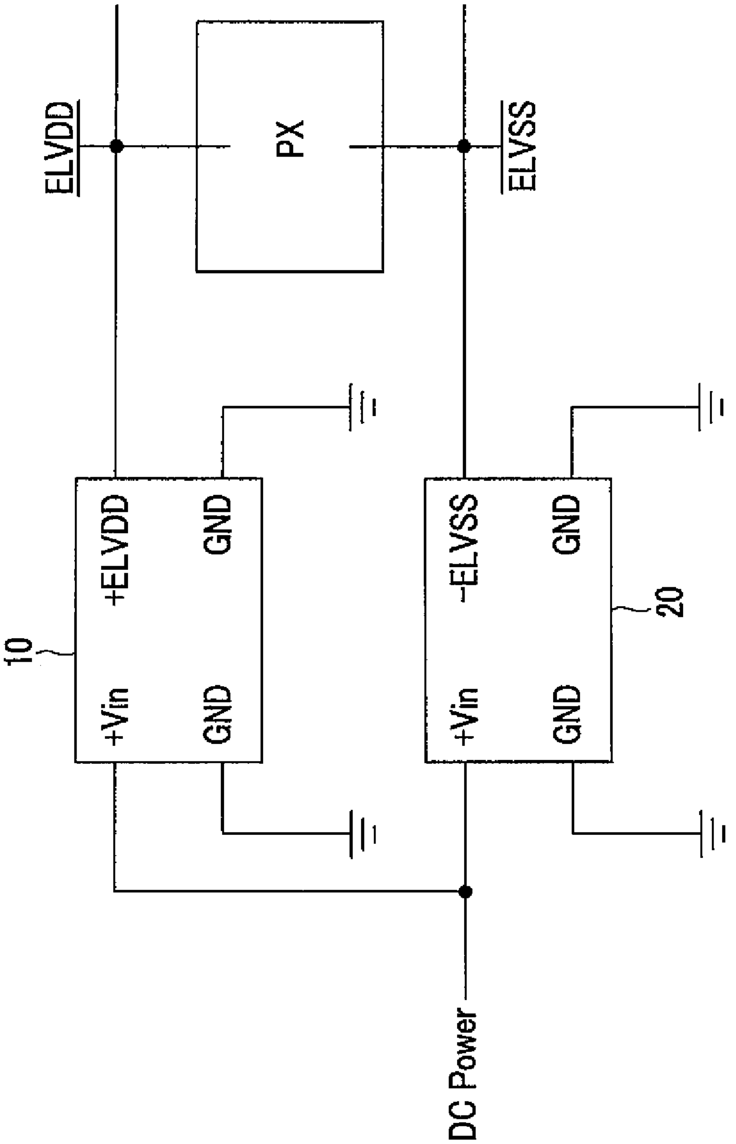
FIG.1 Related Art
FIG. 1 is a block diagram showing an EL power supply of a conventional organic light emitting diode (OLED) display.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
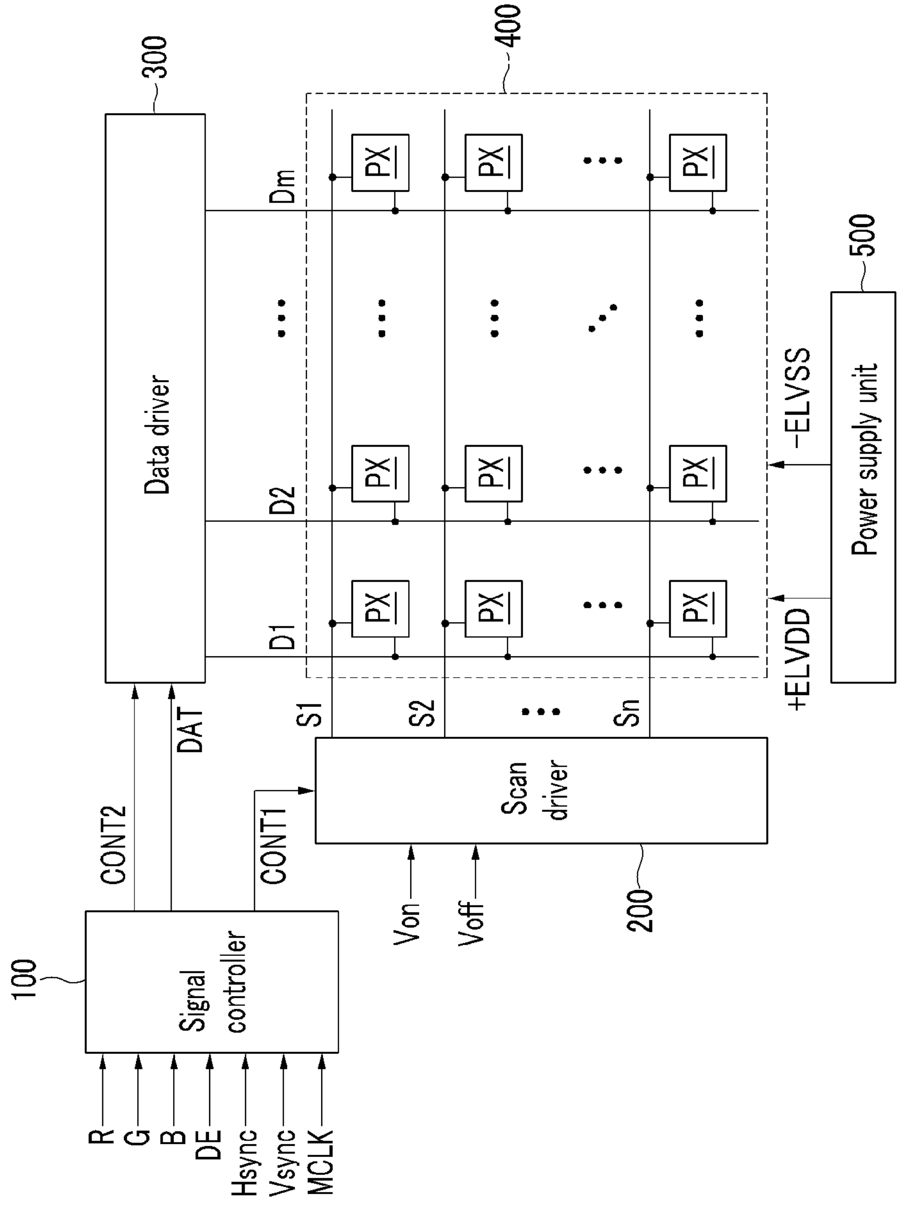
FIG. 2 is a block diagram showing an organic light emitting diode (OLED) display according to an embodiment of the present invention.

FIG. 2 is a block diagram showing an organic light emitting diode (OLED) display according to an embodiment of the present invention. Referring to FIG. 2, the OLED display includes a signal controller 100, a scan driver 200, a data driver 300, a display unit 400, and a power supply unit 500.

The signal controller 100 receives video signals R, G, and B inputted from an external device, and receives input control signals that control displaying of the video signals R, G, B. The video signals R, G, and B include luminance information corresponding to each pixel PX, and the luminance information has a grayscale having a predetermined number, such as $1024=2^{10}$, $256=2^{8}$, or $64=2^{6}$. For example, the input control signals include a vertical synchronization signal Vsync, a horizontal synchronization signal Hsync, a main clock MCLK, and a data enable signal DE.

The signal controller 100 processes the input video signals R, G, and B corresponding to operation conditions of the display unit 400 and the data driver 300 based on the input video signals R, G, and B and the input control signals. The signal controller 100 generates a scan control signal CONT1, a data control signal CONT2, and an image data signal DAT. The signal controller 100 transmits the scan control signal CONT1 to the scan driver 200. The signal controller 100 transmits the data control signal CONT2 and image data signal DAT to the data driver 300.

The display unit 400 includes scan lines S1-Sn, data lines D1-Dm, and pixels PX that are connected to the scan lines S1-Sn and the data lines D1-Dm. The pixels PX are arranged in a matrix form. The scan lines S1-Sn extend in a row direction and are approximately parallel to each other, and the data lines D1-Dm extend in a column direction and are approximately parallel to each other.

The scan driver 200 is connected to the scan lines S1-Sn. The scan driver 200 applies scan signals that include a combination of a gate-on voltage Von and a gate-off voltage. The gate-on voltage Von turns on a switching transistor (see M1 of FIG. 3) and the gate-off voltage Voff turns the switching transistor off to the scan lines S1-Sn according to the scan control signal CONT1. The data driver 300 is connected to the data lines D1-Dm, and selects a data voltage according to the image data signal DAT. The data driver 300 applies the selected data voltage as the data signal to the data lines D1-Dm according to the data control signal CONT2.

The power supply unit 500 supplies the +ELVDD voltage and the −ELVSS voltage of the OLED of each pixel PX of the display unit 400. The power supply unit 500 supplies the output voltage of a high level as the +ELVDD voltage and the output voltage of a low level as the −ELVSS voltage. The power supply unit supplies the +ELVDD voltage and the −ELVSS voltage by using a power supply circuit of which the output generated from the input voltage is floated.

Figure 3:
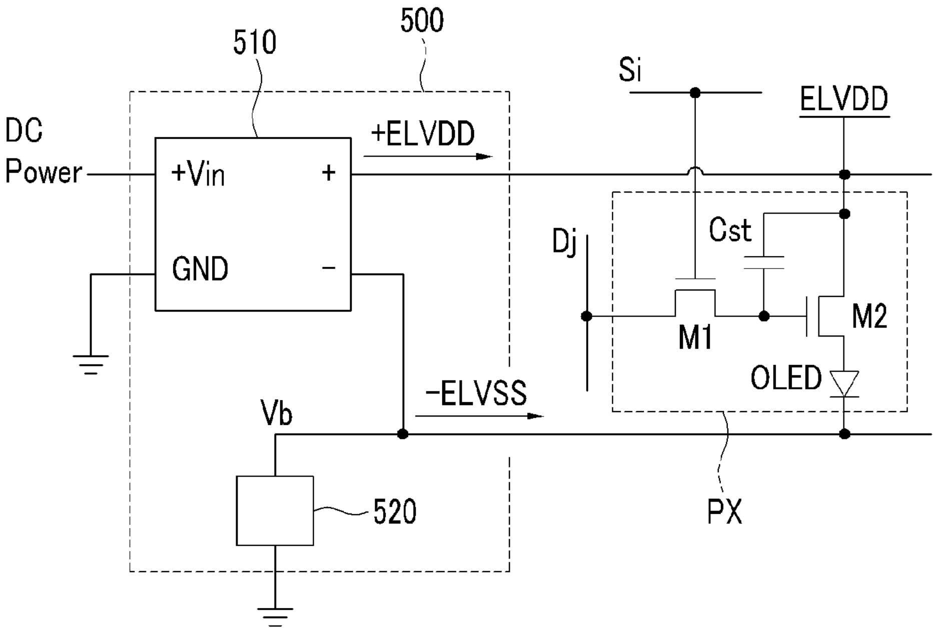
FIG. 3 is a circuit diagram showing a pixel and a power supply as a power source in an organic light emitting diode (OLED) display according to an embodiment of the present invention.

FIG. 3 is a circuit diagram showing a pixel and a power supply as a power source to the pixel in an organic light emitting diode (OLED) display according to an embodiment of the present invention. Referring to FIG. 3, the pixel PX of the OLED display includes an OLED and a pixel circuit to control the OLED. The pixel circuit includes a switching transistor M1, a driving transistor M2, and a sustain capacitor Cst.

The switching transistor M1 includes a gate electrode connected to the scan line Si, one terminal connected to the data line Dj, and another other terminal connected to the gate electrode of the driving transistor M2. The switching transistor M1 applies a data signal to a gate electrode of the driving transistor M2 according to a scan signal of the scan line Si. The driving transistor M2 includes the gate electrode connected to the other terminal of the switching transistor M1, and also has a terminal connected to an ELVDD power supply, and another terminal connected to an anode of the OLED.

The sustain capacitor Cst includes a terminal connected to the other terminal of the switching transistor M2 and the sustain capacitor Cst has another terminal connected to the ELVDD power supply. The OLED includes the anode connected to the other terminal of the driving transistor M2 and has a cathode connected to an ELVSS power supply.

If a gate-on voltage Von is applied to the scan line Si, the switching transistor M1 is turned on and the data signal that is applied to the data line Dj is applied to an end of the sustain capacitor Cst. The data signal is applied through the turned on switching transistor M1 to charge the sustain capacitor Cst. The driving transistor M2 controls an amount of current that flows from the ELVDD power source to the OLED by corresponding to the voltage value that is charged in the sustain capacitor Cst.

The OLED emits light that corresponds to the amount of current that flows through the driving transistor M2. The OLED emits light of one color of primary colors red, green, and blue, and a desired color is displayed by a spatial or temporal sum of these three primary colors. In this case, a portion of the OLED emits white light, and if this is performed, a luminance is increased. Unlike this, an OLED of all the pixels PX can emit white light, and a portion of the pixels PX may further include a color filter (not shown) that converts the white light that is emitted from the organic light emitting diode (OLED) into any one of the primary colors.

The power supply unit 500, according to the present embodiment of the present invention, includes a first power source circuit 510 and a bias circuit 520. The first power source circuit 510 generates the output voltage +V by using the input voltage Vin. The first power source circuit 510 includes an output terminal (+) and a reference terminal (−), and supplies a first power source voltage to the display unit through the output terminal (+). The output terminal (+) and the reference terminal (−) are floated with respect to the input terminal +Vin of the first power source circuit 510.

The first power source circuit 510 generates an output voltage that is more than a potential input to the reference terminal (−) by a predetermined voltage. The first power source circuit 510 is operated such that the output voltage +V is the first power source voltage +ELVDD. That is, although a potential of the reference terminal (−) can have any value, the output voltage +V is maintained as the first power source voltage +ELVDD.

The bias circuit 520 is connected to the reference terminal (−) of the first power source circuit 510. The bias circuit 520 outputs a predetermined bias voltage Vb that is referenced to the ground (GND) voltage. The bias circuit 520 is a fixing bias circuit or a current feedback bias circuit, both of which are well known to one of ordinary skill in the art. The bias circuit 520 outputs a voltage of less than the ground (GND) voltage as the bias voltage Vb. Although not required in all aspects of the present invention, the output of the bias circuit 520 is −ELVSS, that is, the second power source voltage level.

Thus, the reference potential supplied through the reference terminal (−) of the first power source circuit 510 is supplied as the second power source voltage level. Also, the first power source circuit 510 generates the output voltage corresponding to ELVDD+ELVSS by using the input voltage (Vin). The output voltage +V output through the output terminal (+) is the voltage that is higher by an amount of the potential of the ELVDD+ELVSS with respect to the reference potential of the reference terminal (−), that is, the first power source voltage level.

The output terminal (+) and the reference terminal (−) of the first power source circuit 510 are floated with respect to the input terminal +Vin, and the current does not flow to the bias circuit 520. The output voltage of the bias circuit 520 is a negative voltage such that the current path flowing to the ground is not formed. That is, the current flowing in the pixels flows to the reference terminal (−).

The first output voltage +V of the first power source circuit 510 is supplied as the +ELVDD voltage of the ELVDD power supply to power the OLED to emit light. The second power source voltage of the reference terminal (−) has a predetermined potential, which is referenced to the GND voltage, according to the bias voltage Vb of the bias circuit 520. The second power source voltage is supplied as the −ELVSS voltage of the ELVSS power supply to power the OLED to emit light.

The bias circuit 520 is simple compared with the −ELVSS power supply circuit such that a structure of the OLED display is simplified and the cost thereof may be reduced. Also, an output capacity of the bias circuit 520 may be very small such that a power efficiency may be improved.

Each of the driving apparatuses 100, 200, 300, and 500 are directly mounted on the display unit 400 as at least one integrated circuit chip, are mounted on the flexible printed circuit film, are attached to the display 400 as a TCP (tape carrier package), are mounted on a separate flexible printed circuit FPC, or are integrated on the display unit 400 in conjunction with the signal lines S1-Sn and D1-Dm.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A display device comprising:
- a display unit including pixels each comprising an organic light emitting diode (OLED); and
- a power supply unit configured to generate a first power source voltage based on an input voltage, the power supply unit comprising:
  - an output terminal;
  - a reference terminal; and
  - a bias circuit comprising:
    - a first terminal coupled between the reference terminal and a cathode of the OLED; and
    - a second terminal coupled to a ground voltage power supply, wherein the bias circuit is configured to supply a second power source voltage to the reference terminal, wherein the second power source voltage is independent from the first power source voltage,
- wherein the first power source voltage and the second power source voltage are voltages driving the pixels,
- wherein the bias circuit is configured to supply the second power source voltage to the pixels and is referenced to a ground voltage,
- wherein a current flowing to the pixels flows to the reference terminal, and
- wherein the bias circuit is configured such that the current flowing to the pixels does not flow through the bias circuit.

2. The display device of claim 1, wherein the first power source voltage is an ELVDD voltage for driving the OLED, and
- wherein the second power source voltage is an ELVSS voltage for driving the OLED.

3. The display device of claim 2, wherein an output voltage of the output terminal is a sum of the ELVDD voltage and the ELVSS voltage.

4. The display device of claim 1, wherein a voltage of the second power source voltage is lower than the ground voltage.

5. The display device of claim 1, wherein each of the pixels include:
- an organic light emitting diode (OLED);
- a driving transistor configured to control an amount of current flowing from an ELVDD electrode, the current being transmitted according to the first power source voltage to the OLED; and
- a switching transistor configured to apply a data signal to a gate electrode of the driving transistor.

6. The display device of claim 5, wherein the first power source voltage is connected to a terminal of the driving transistor,
- wherein another terminal of the driving transistor is connected to an anode of the OLED, and wherein the second power supply voltage is connected to the cathode of the OLED.

7. A power supply configured to supply an ELVDD voltage and an ELVSS voltage for powering electro-luminescence of an organic light emitting diode (OLED) display comprising an OLED, the power supply comprising:

a power supply circuit configured to receive an input voltage and to generate a first power source voltage, the power supply circuit comprising:

an output terminal; and a reference terminal; and a bias circuit comprising:

a first terminal coupled between the reference terminal and a cathode of the OLED; and a second terminal coupled to a ground voltage power supply, wherein the bias circuit is configured to supply a second power source voltage to the reference terminal, wherein the second power source voltage is independent form the first power source voltage, wherein the bias circuit is configured such that a current flowing from the output terminal does not flow through the bias circuit.

8. The power supply of claim 7, wherein the output terminal is connected to an ELVDD power supply of the OLED display, and wherein the reference terminal is connected to an ELVSS power supply of the OLED display.

9. The power supply of claim 7, wherein the first power source voltage is an ELVDD voltage driving the OLED, and wherein the second power source voltage is an ELVSS voltage driving the OLED.

10. The power supply of claim 7, wherein an output voltage of the output terminal is a sum of the ELVDD voltage and the ELVSS voltage.

11. The power supply of claim 7, wherein a voltage of the second power source voltage is lower than a ground voltage.

12. A display device comprising:

a display unit including pixels, each having an organic light emitting diode (OLED); and a power supply unit receiving an input voltage and outputting a first power source voltage and a second power source voltage to drive the pixels, wherein the power supply unit comprises:

an output terminal;

a reference terminal having an output, wherein the reference terminal is electrically insulated from the output terminal within the power supply unit; and a bias circuit comprising:

a first terminal coupled between the reference terminal and a cathode of an OLED of a pixel of the pixels; and a second terminal coupled to a ground voltage power supply, wherein the bias circuit is configured to supply the second power source voltage to the reference terminal, wherein the second power source voltage is independent from the first power source voltage, wherein the bias circuit is configured such that a current flowing to the pixels from the output terminal does not flow through the bias circuit.

13. The display device of claim 12, wherein the bias circuit supplies the second power source voltage to the pixels and is referenced to a ground voltage, and wherein a current flowing to the pixels flows to the reference terminal.

14. The display device of claim 13, wherein a voltage of the second power source voltage is lower than the ground voltage.

15. The display device of claim 12, wherein the first power source voltage is an ELVDD voltage driving the OLED, and wherein the second power source voltage is an ELVSS voltage driving the OLED.

16. The display device of claim 15, wherein the output voltage of the output terminal is a sum of the ELVDD voltage and the ELVSS voltage.

17. The display device of claim 12, wherein each of the pixels include:

a driving transistor controlling an amount of current flowing from an ELVDD electrode, the current being transmitted according to the first power source voltage to the OLED; and a switching transistor applying a data signal to a gate electrode of the driving transistor.

* * * * *